Feb. 10, 1959 P. SHAFFER 2,872,810
VENTURI FLOW METER
Filed Feb. 14, 1956
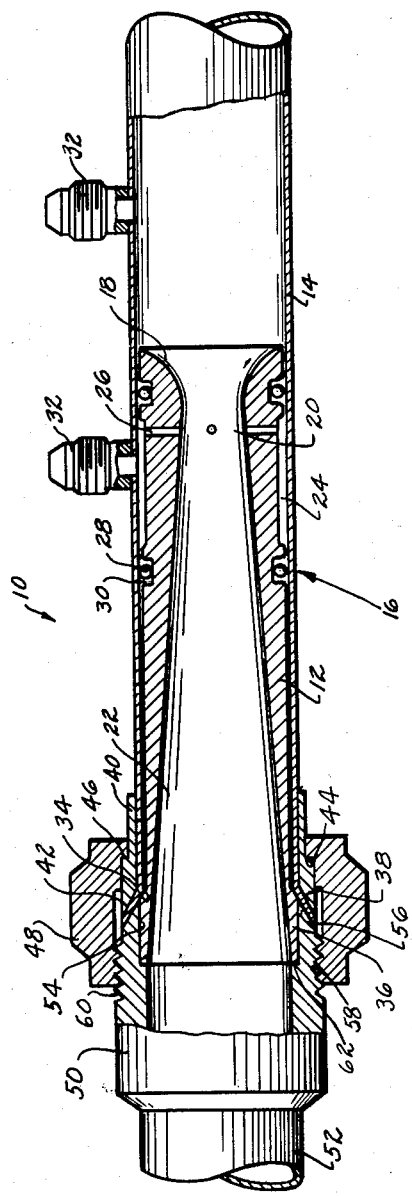
INVENTOR.
PERRY SHAFFER
BY Wade Koontz
Paul M. Pahules AND
ATTORNEYS United States Patent Office 2,872,810
Patented Feb. 10, 1959

2,872,810

VENTURI FLOW METER

Perry Shaffer, Claremont, Calif., assignor to the United States of America as represented by the Secretary of the Air Force Application February 14, 1956, Serial No. 565,519

1 Claim. (Cl. 73—213)

This invention relates to a flow meter, and more particularly, to an improved flow meter of the type employing a venturi tube arranged to be installed in a conduit of a flow system for measuring differential pressures therein.

The novel flow metering device constructed in accordance with the present invention is particularly characterized by its simplicity of construction requiring only a minimum of work for its installation and at a relatively low cost.

The present invention provides a venturi flow meter that can be quickly and very easily installed in existing tubing of flow systems, using only standard tubing and requiring very little modifications to the tubing and associated fittings.

According to the present invention, the flow meter comprises a venturi tube provided with a circumferential shoulder on the outer surface thereof and arranged to be inserted in a short, straight section of an end flanged conduit of a flow system, the shoulder of the venturi tube adapted to abut the flanged end of the conduit. Coupling means connected to the conduit is recessed in the inner surface thereof for receiving an end of the venturi tube adjacent the shoulder thereof providing a substantially continuous surface therein, and is arranged to clamp the venturi tube shoulder and the conduit flared end together thereby securing the venturi tube in the conduit section.

These and other features of the present invention are described in detail below in connection with the accompanying drawing.

The single figure in the drawing shows a longitudinal section of a venturi flow meter constructed in accordance with the present invention.

Referring now in detail to the drawing wherein like numerals designate like parts, the embodiment of the flow meter of the present invention is indicated generally by the reference numeral 10, and, as shown, comprises a venturi tube 12 inserted in a short, straight section 14 of a conduit 16 of a flow system for measuring differential pressures of the fluid flow in the conduit 16. The flow of any given fluid in the conduit 16 may be calculated by using the standard venturi equation:

$$Q = K\sqrt{\Delta P}$$

wherein $Q$ = flow—lbs./sec.; $K$ = constant of venturi; and $\Delta P$ = differential pressure—lbs./in.$^2$.

Then venturi tube 12 is constructed with a substantially uniform outer diameter for a major portion thereof and with portions of different inner diameters constituting an upstream section 18 formed with an outwardly flared inner longitudinal cross section, a throat section 20, and a downstream section 22 formed with a diverging inner longitudinal cross section. An annular recess 24 formed in the outer surface of the venturi tube 12 is connected with the interior of the venturi tube 12, at the throat section 20, by orifices 26 extending radially through the wall of the venturi tube 12. The annular recess is sealed in the conduit section 14 by O seal rings 28 retained in grooves 30 formed in the outer surface of the venturi tube 12 and adjacent the recess 24. A pair of nipples 32 is disposed on the conduit section 14 for measuring flow pressures, one of the nipples 32 being in communication with the annular recess 24 while the other nipple 32 is in communication with the interior of the conduit section 14 ahead of the upstream section 18 of the venturi tube 12. Differential pressures of the fluid flow may be measured by attaching a differential pressure pick-up (not shown) to the nipples 32 thereby recording fluid flow pressures therein.

The venturi tube 12 is further formed with an outwardly tapered shoulder 34 extending circumferentially on the outer surface thereof and adjacent an end section 36 at the side of the downstream section 22 thereby increasing the outer diameter of the venturi tube 12 at the end section 36. The shoulder 34, with the venturi tube 12 inserted in the conduit section 14, is arranged to abut an outwardly flared end flange 38 of the conduit section 14. The conduit end flange 38 is arranged to extend radially of the venturi tube shoulder 34, and the venturi tube end section 36 is arranged to extend axially of the conduit flange 38 for purposes as hereinafter described.

A sleeve or tubular member 40 is inserted over the conduit section 14 and is formed with an outwardly tapered end edge 42 adapted to abut the conduit flared end flange 38. The sleeve 40 is further formed with an outer shoulder 44 engaged by an inner shoulder 46 of a coupling member 48.

A fitting member 50 engaging another section 52 of the conduit 16 is provided with an annular recess 54 formed in the inner surface thereof for receiving the end section 36 of the venturi tube 12 extending axially of the conduit end flange 38, thereby providing a substantially continuous inner surface therein. The fitting member 50 is further formed with an inwardly tapered end edge 56 adapted to abut the portion of the conduit flange 38 extending radially of the venturi tube shoulder 34.

The coupling member 48 being provided also with inner threads 58 is adapted to engage outer threads 60 formed on the fitting member 50 for coupling therewith. In this manner, the sleeve member 40 and the fitting member 50 are arranged to clamp the flared end flange 38 of the conduit sections 14 by exerting pressure on the portion of the flange 38 extending between their end edges 42 and 56, respectively. Also, the flared end flange 38 of the conduit section 14 and the shoulder 34 of the venturi tube 12 are clamped together by the pressure exerted at the end edge of the venturi tube 12 abutting a shoulder 62 formed by the formation of the recess 54 in the inner surface of the fitting member 50 and the pressure exerted on the flange 38 by the sleeve member 40 thereby effectively securing the venturi tube 12 in the conduit 16.

The present invention has been described in detail above for purposes of illustration only and is not intended to be limited by this description or otherwise except as defined in the appended claim.

I claim:

In a venturi apparatus of the character described, a two-part conduit, each of said parts being adapted for removable connection to each other by a flared tube type coupling including an annular sleeve secured to the end of the first of said conduit parts having external threads on the periphery thereof and the end of said sleeve having a tapered end face adapted to engage the flared end of the second of said conduit parts, a nut adapted to be threaded onto said sleeve and to exert clamping pressure on said second conduit flared end to effect a fluid tight seal, an annular groove on the underside of said sleeve extending longitudinally through the tapered end face thereof, a venturi tube adapted to be inserted in said conduit parts, said venturi tube having a first cylindrical head portion at the outlet end thereof adapted to fit into the annular groove on said conduit sleeve and to be clamped therein by assembly of said coupling, said venturi tube having a second cylindrical head portion adjacent the throat thereof and adapted to fit closely into the interior of said second conduit part, said second head portion having a pair of annular grooves symmetrically spaced with respect to the venturi throat, resilient packing elements in said grooves adapted to seal said second head against the second conduit part inner wall, an annular recess in said second head portion between said packing grooves, a plurality of orifices connecting said annular recess with the venturi throat, and a lateral conduit secured to said second conduit part adapted to communicate with the annular recess in said second head portion.

References Cited in the file of this patent

UNITED STATES PATENTS

| | | |
|---|---|---|
| 1,266,428 | Dodge | May 14, 1918 |
| 1,366,522 | Crowell | Jan. 25, 1921 |
| 1,559,155 | Bullock | Oct. 27, 1925 |
| 2,284,013 | Pardoe | May 26, 1942 |
| 2,523,578 | Lewis | Sept. 26, 1950 |
| 2,752,949 | Jones | July 3, 1956 |
| 2,761,704 | Crawford | Sept. 4, 1956 |

FOREIGN PATENTS

| | | |
|---|---|---|
| 147,445 | Austria | Oct. 26, 1936 |
| 552,863 | Great Britain | Apr. 28, 1943 |